United States Patent
Wei et al.

(10) Patent No.: US 12,136,399 B2
(45) Date of Patent: Nov. 5, 2024

(54) CONTROL METHOD AND ELECTRONIC DEVICE

(71) Applicant: Lenovo (Beijing) Limited, Beijing (CN)

(72) Inventors: Haixia Wei, Beijing (CN); Xiangzi Kong, Beijing (CN); Shuzi Tian, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/067,011

(22) Filed: Dec. 15, 2022

(65) Prior Publication Data
US 2023/0215394 A1  Jul. 6, 2023

(30) Foreign Application Priority Data

Dec. 31, 2021  (CN) .......................... 202111679174.1

(51) Int. Cl.
*G09G 3/36* (2006.01)
*G06T 7/70* (2017.01)

(52) U.S. Cl.
CPC ................ *G09G 3/36* (2013.01); *G06T 7/70* (2017.01); *G09G 2320/0233* (2013.01); *G09G 2320/0626* (2013.01)

(58) Field of Classification Search
CPC ..... G09G 3/36; G09G 2320/0233; G06T 7/70
See application file for complete search history.

(56) References Cited

U.S. PATENT DOCUMENTS

| | | | | |
|---|---|---|---|---|
| 8,502,816 B2* | 8/2013 | Butler | ................ | G06F 3/0488 |
| | | | | 362/558 |
| 10,008,164 B2* | 6/2018 | Du | ...................... | G02F 1/13476 |
| 10,971,059 B2* | 4/2021 | Guo | ........................ | G09G 3/03 |
| 11,191,146 B2* | 11/2021 | Woodgate | .............. | H05B 47/11 |
| 11,294,209 B2* | 4/2022 | Fan | ....................... | G09G 3/3648 |
| 11,315,509 B2* | 4/2022 | Qiao | .................... | G09G 3/3614 |
| 2019/0206312 A1* | 7/2019 | Guo | ........................ | G09G 3/03 |
| 2020/0034575 A1 | 1/2020 | Wu et al. | | |
| 2020/0333681 A1* | 10/2020 | Wei | ...................... | H04N 13/368 |
| 2023/0114708 A1* | 4/2023 | Harada | ................ | G09G 3/3406 |
| | | | | 345/694 |

FOREIGN PATENT DOCUMENTS

| | | |
|---|---|---|
| CN | 106292018 A | 1/2017 |
| CN | 107037618 A | 8/2017 |
| CN | 108490703 A | 9/2018 |
| CN | 111125799 A | 5/2020 |
| CN | 113031319 A | 6/2021 |

* cited by examiner

*Primary Examiner* — Gene W Lee
(74) *Attorney, Agent, or Firm* — ANOVA LAW GROUP, PLLC

(57) ABSTRACT

A control method includes detecting a first object within a first range corresponding to an output device, obtaining a first relative position relationship between the first object and the output device, and adjusting an output parameter of output light of the output device based on the first relative position relationship, to cause the output device to be in a first output state relative to the first object.

18 Claims, 16 Drawing Sheets

US 12,136,399 B2

CONTROL METHOD AND ELECTRONIC DEVICE

CROSS-REFERENCE TO RELATED APPLICATION

The present application claims priority to Chinese Patent Application No. 202111679174.1, filed Dec. 31, 2021, the entire content of which is incorporated herein by reference.

TECHNICAL FIELD

The present disclosure relates to the field of screen technology and, in particular, to a control method and an electronic device.

BACKGROUND

To protect user privacy, a display screen of an electronic device usually activates a privacy-protection mode, so that surrounding bystanders can only see a black screen.

However, due to different viewing angles and distances of the surrounding bystanders relative to the display screen, brightness of the black screen seen by the surrounding bystanders is different, and the surrounding bystanders may see private content at a bright area, thereby leading to privacy leakage.

SUMMARY

In accordance with the disclosure, there is provided a control method including detecting a first object within a first range corresponding to an output device, obtaining a first relative position relationship between the first object and the output device, and adjusting an output parameter of output light of the output device based on the first relative position relationship, to cause the output device to be in a first output state relative to the first object.

Also in accordance with the disclosure, there is provided an output device including a light output device configured to output light, and a controller configured to detect a first object within a first range corresponding to an output device, obtain a first relative position relationship between the first object and the output device, and adjust an output parameter of output light of the output device based on the first relative position relationship, to cause the output device to be in a first output state relative to the first object.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
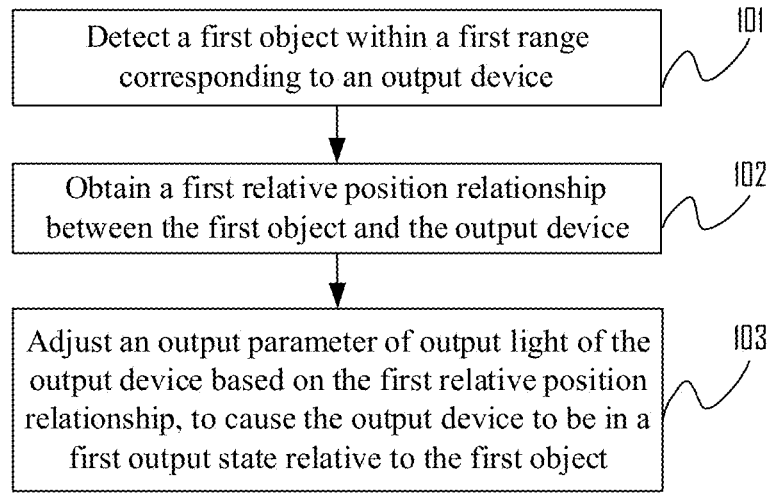
FIG. 1 is a schematic flow chart of a control method consistent with the embodiments of the disclosure.

FIG. 1 is a schematic flow chart of a control method consistent with the embodiments of the disclosure. The control method can be applied to an output device that can output specific content by outputting light. The output device may include a mobile phone, a pad, a notebook, or a computer that has a display screen for outputting content for a user by outputting specific light. The technical solution consistent with the embodiments is used to adjust an output parameter of output light of the output device, to avoid privacy leakage when the output device is in an output state relative to a first object. As shown in FIG. 1, the control method includes the following processes.

At 101, a first object within a first range corresponding to the output device is detected.

The output light of the output device has a second range. The second range is a preset output range of the output light. The first range is a light leakage range of the output light. The first range is different from the second range. For example, the second range may be a passing range of the output light that is perpendicular to a plane where the output device is located. The first range may be a passing range of the output light that is not perpendicular to the plane where the output device is located.

Figure 2:
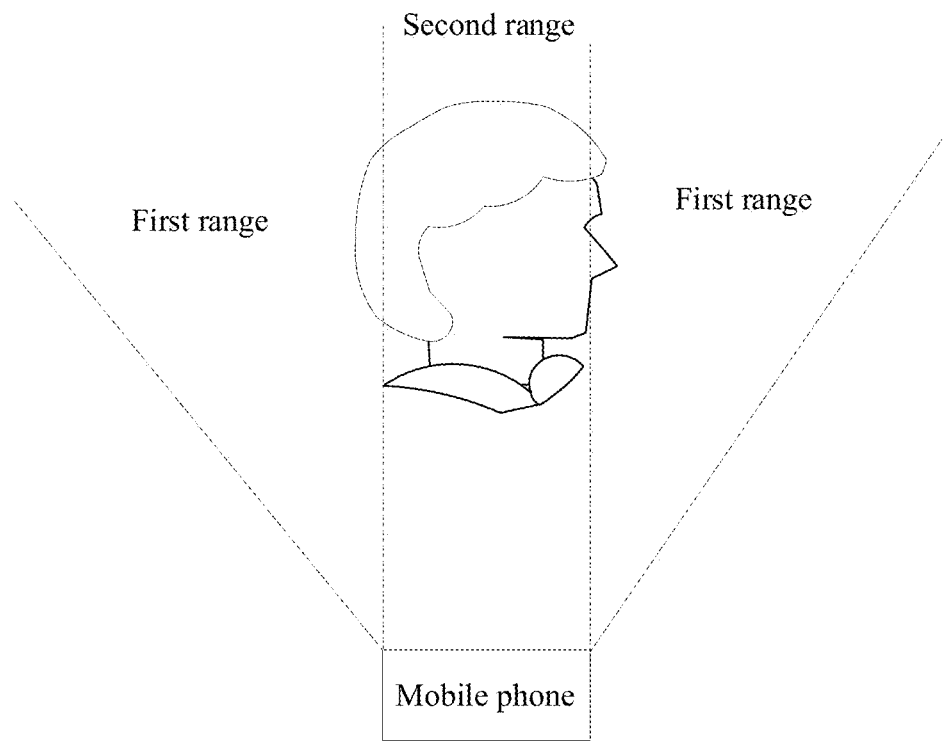
FIG. 2 is a schematic diagram showing a range that an object is within according to an example embodiment of the disclosure.

Taking a mobile phone as an example, as shown in FIG. 2, the first range is a side view range of the mobile phone, and the second range is a front view range of the mobile phone. For a user of the mobile phone, the first object within the first range may be regarded as a bystander or observer of the mobile phone.

The first object within the first range corresponding to the output device is detected in real time. The first object may be at least a part of an object of a human body, for example, a human body outline, a human head, a face, an eye, or a forehead.

In some embodiments, an image acquisition device, for example, a camera may be used to collect a face image of a person appearing within the first range. A recognized face may be used as the first object.

In some embodiments, the image acquisition device, for example, the camera, may be used to collect an eye image of a person appearing in the first range. A recognized human eye through gaze tracking may be used as the first object.

At 102, a first relative position relationship between the first object and the output device is obtained.

Figure 3:
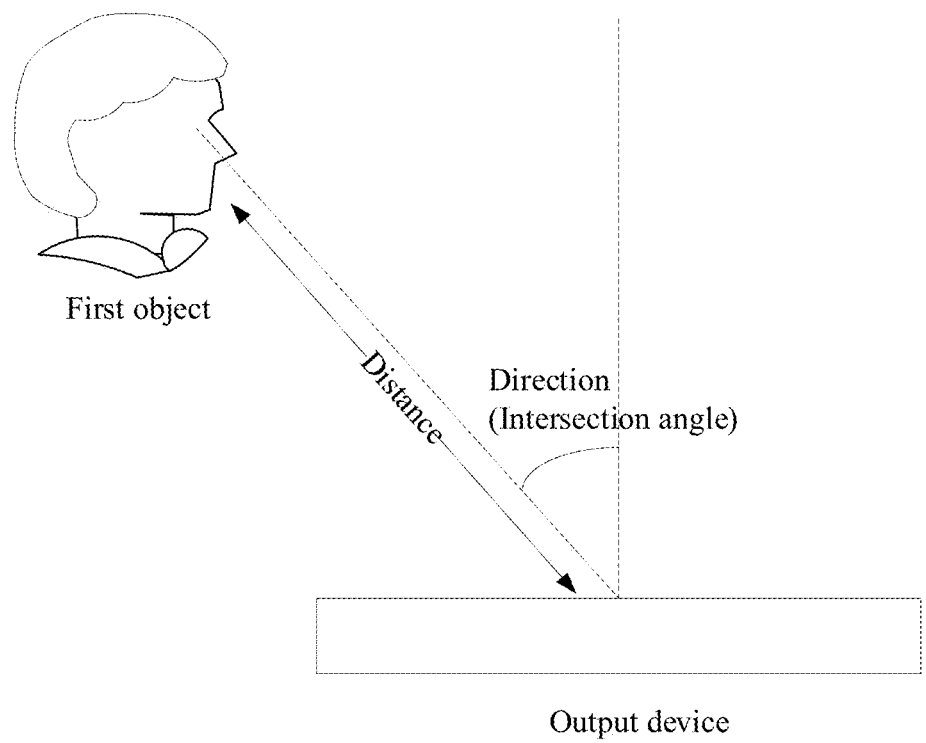
FIG. 3 is a schematic diagram showing a relative position relationship between a first object and an output device according to an example embodiment of the disclosure.

The first relative position relationship may include an object direction of the first object relative to the output device and/or an object distance between the first object and the output device. The object direction may be represented by a relative direction of the first object in a coordinate system with any point of the output device as a coordinate origin, or may be represented by an angle between a line connecting the first object and any point of the output device and a straight line perpendicular to the plane where the output device is located. The object distance can be represented by a distance between the first object and any point of the output device. For example, as shown in FIG. 3, the object direction is represented by an angle between a line connecting the first object and a center point of the output device and a vertical line of the plane where the output device is located. The object distance is represented by a distance between the first object and the center point of the output device.

In some embodiments, the first relative position relationship of the first object with respect to the output device may be obtained through an image acquisition device such as a camera or a locator such as an infrared sensor.

At 103, the output parameter of the output light of the output device is adjusted based on the first relative position relationship, to cause the output device to be in a first output state relative to the first object.

The first output state includes a state where the position of the first object cannot receive at least part of the output light from the output device. For example, the first output state includes any one or more of a state that the first object cannot receive the output light of the output device, a state that brightness of the output light of the output device received by the first object is lower than a preset brightness threshold, and a state that the brightness of the output light of the output device received by the first object is at least approximately uniform in the output area.

In some embodiments, the brightness and/or a light angle of the output light of the output device may be adjusted, to cause the output device to be in the first output state relative to the first object.

The first object within the first range cannot receive the output light from the output device, or the received output light cannot allow the first object to recognize valid content.

After the first object within the first range corresponding to the output device is detected, the relative position relationship between the first object and the output device is obtained. The output parameter of the output light of the output device is adjusted based on the relative position relationship, to cause the output device to be in the first output state relative to the first object, thereby avoiding privacy leakage when the output device is in another output state relative to the first object.

In some embodiments, the output area of the output device may be divided into a plurality of sub-areas. The plurality of sub-areas may be symmetrical about a center point or a center line of the output area.

Figure 4:
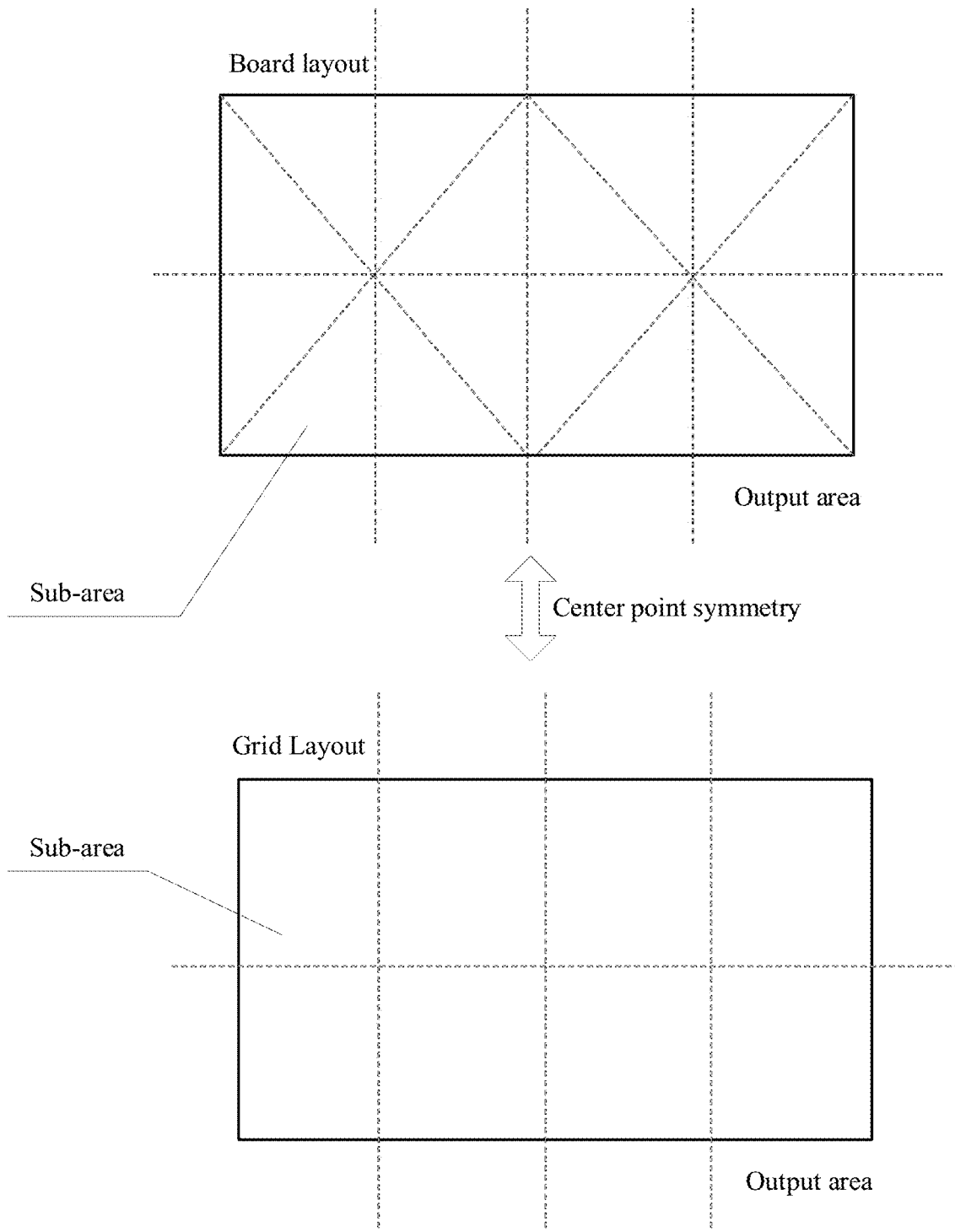
FIGS. 4-7 are schematic diagrams showing sub-areas consistent with the embodiments of the disclosure.
Figure 5:
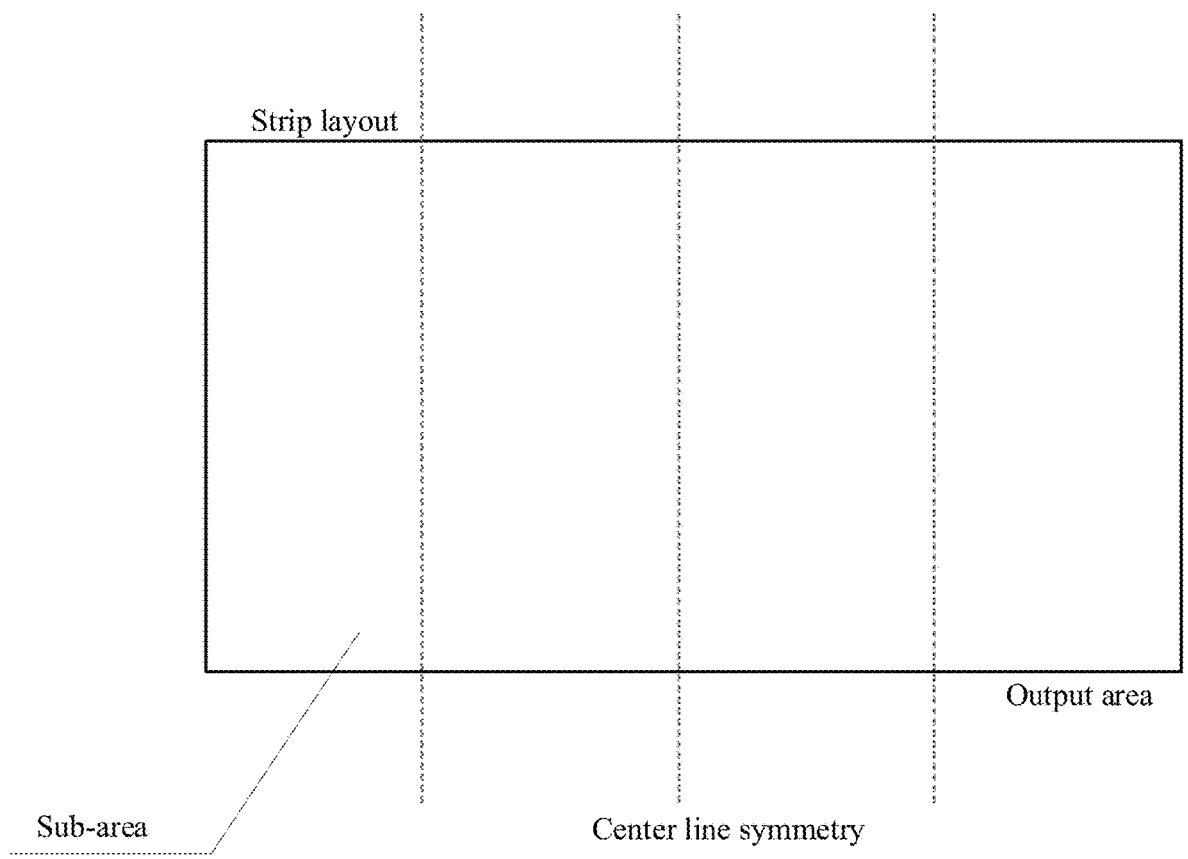

For example, as shown in FIG. 4, the sub-areas of the output area are in a board layout, which is symmetrical about the center point of the output area, or, the sub-areas of the output area are in a grid layout, which is symmetrical about the center point of the output area. As shown in FIG. 5, the sub-areas of the output area are in a strip layout, which is symmetrical about the center line of the output area.

The first relative position relationship may include a position relationship between the first object and any one of the sub-areas of the output area. That is, the first relative position relationship includes the position relationship between the first object and each one of the plurality of sub-areas of the output area.

Figure 6:
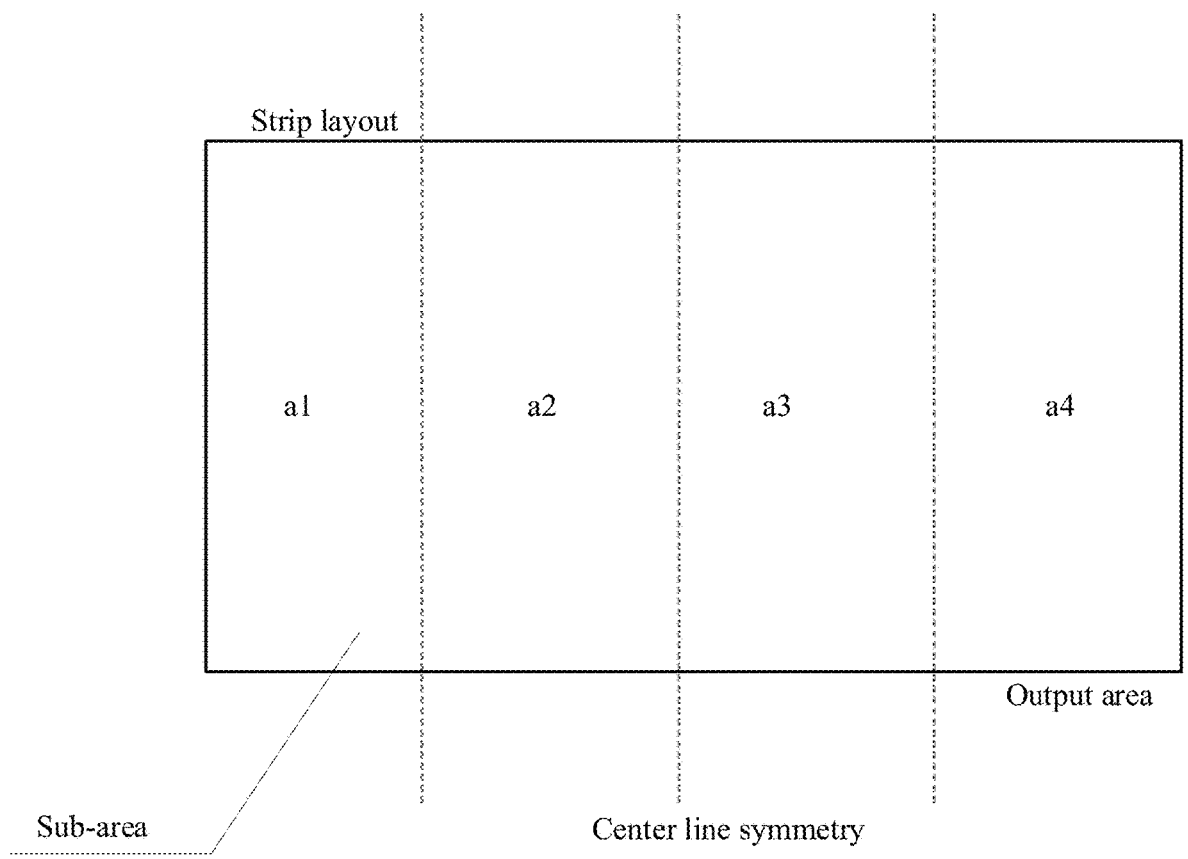

Taking the sub-areas in the stripe layout as an example, the output area is evenly divided into 4 sub-areas according to an H direction, which are symmetrical about the center line of the output area, namely a1, a2, a3, and a4. As shown in FIG. 6, the first object is within the first range corresponding to the output device, and the first relative position relationship between the first object and the output device includes a relative position relationship between the first object and the sub-area a1, a relative position relationship between the first object and the sub-area a2, a relative position relationship between the first object and the sub-area a3, and a relative position relationship between the first object and the sub-area a4.

In some embodiments, adjusting the output parameter of the output light of the output device in process 103 can be specifically implemented in the following ways.

Based on the first relative position relationship, that is, the relative position relationship between the first object and one of the plurality of sub-areas of the output area, an output parameter of output light of the one of the plurality of sub-areas is adjusted. For example, the output parameters of output light of all sub-areas of the output area are adjusted, or the output parameters of output light of some sub-areas of the output area are adjusted, so that the entire output area is in the first output state relative to the first object.

In some embodiments, the relative position relationship between the first object and the sub-area may include a first direction of the first object with respect to the sub-area, and/or a first distance between the first object and the sub-area. The first direction may be represented by an angle between a line connecting the first object and a point of the sub-area and a straight line perpendicular to the sub-area.

Figure 7:
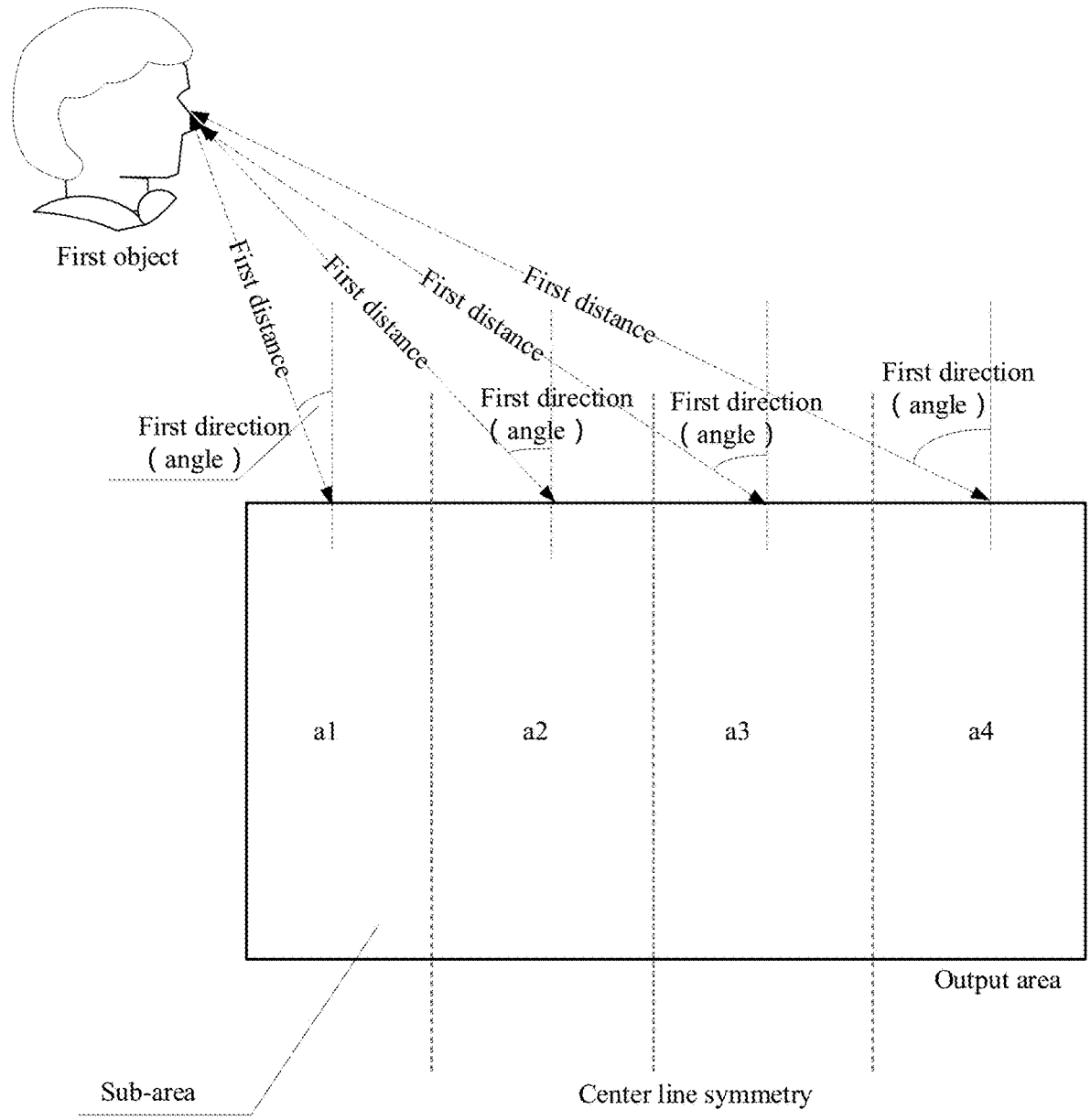

For example, as shown in FIG. 7, taking the sub-areas in the strip layout as an example, the relative position relationship between the first object and the sub-area a1 includes a first direction of the first object with respect to the sub-area a1 and/or a first distance between the object and the sub-area a1, for example, a first angle between a line connecting the first object and a center point of the sub-area a1 and a vertical line of the sub-area a1, and a distance between the first object and the center point of the sub-area a1.

The relative position relationship between the first object and the sub-area a2 includes a first direction of the first object with respect to the sub-area a2 and/or a first distance between the object and the sub-area a1, for example, a first angle between a line connecting the first object and a center point of the sub-area a2 and a vertical line of the sub-area a1, and a distance between the first object and the center point of the sub-area a2.

The relative position relationship between the first object and the sub-area a2 includes a first direction of the first object with respect to the sub-area a3 and/or a first distance between the object and the sub-area a3, for example, a first angle between a line connecting the first object and a center point of the sub-area a3 and a vertical line of the sub-area a1, and a distance between the first object and the center point of the sub-area a3.

The relative position relationship between the first object and the sub-area a4 includes a first direction of the first object with respect to the sub-area a4 and/or a first distance between the object and the sub-area a4, for example, a first angle between a line connecting the first object and a center point of the sub-area a4 and a vertical line of the sub-area a1, and a distance between the first object and the center point of the sub-area a4.

In some embodiments, adjusting the output parameter of the output light of the sub-area of the output device can be specifically implemented in the following ways.

Based the first direction and/or the first distance, a light transmission amount and/or an output angle of the output light of the sub-area are adjusted. For example, based on the first direction and/or the first distance corresponding to the first object at each of the plurality of sub-areas, the light transmission amount and/or the output angle of the output light of all sub-areas or some sub-areas of the output area may be adjusted, to cause the entire output area to be in the first output state with respect to the first object.

The light transmission amount of the output light can be realized by adjusting one or more liquid crystal elements of the output device that affect the light transmission amount. The output angle of the output light can be realized by adjusting a backlight structure of the output device that affects the light output angle.

Figure 8:
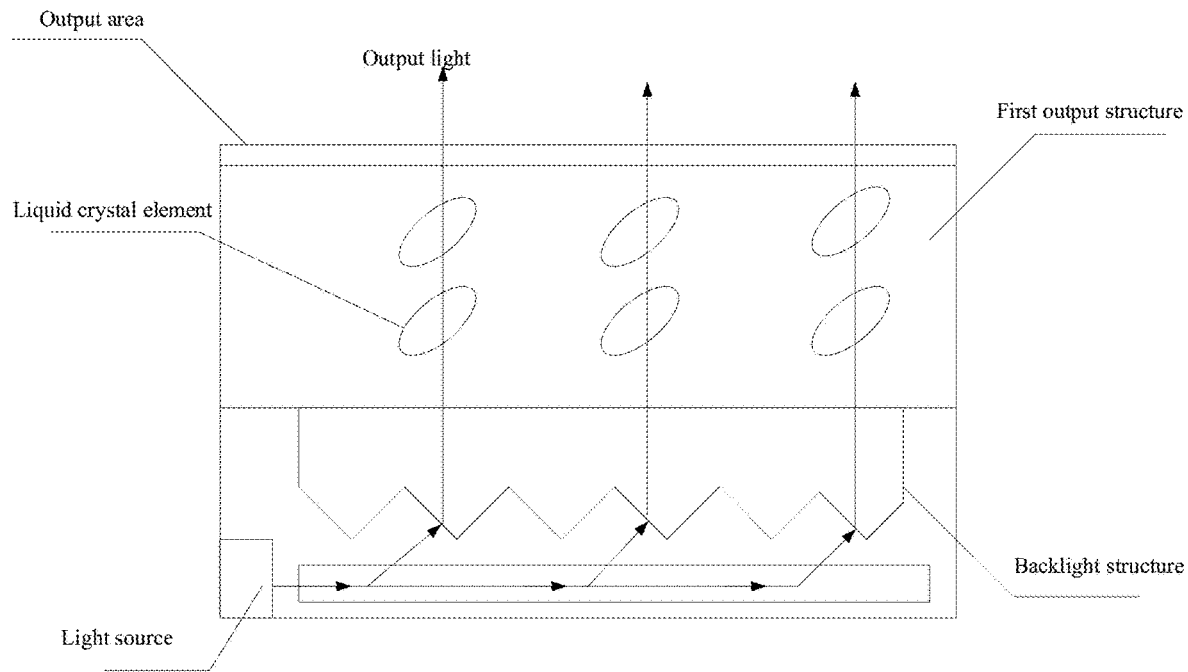
FIG. 8 is a schematic diagram of liquid crystal elements of a first output structure of the output device consistent with the embodiments of the disclosure.

The output device may include a backlight structure and a first output structure. The output angle of the output light output by the light source can be adjusted by adjusting an internal structure of the backlight structure. As shown in FIG. 8, output light of the backlight structure is output at the output area through the first output structure, and the first output structure includes a liquid crystal element. The first output structure may include another structure, for example, a polarizer, a filter glass, etc. In addition, there may be another output structure, for example, a second output structure including liquid crystal elements and other structures.

In some embodiments, based on the first direction and/or the first distance, adjusting the output angle of the output light of the sub-area of the output device can be specifically implemented in the following ways.

Through the backlight structure, the output angle of the output light of the sub-area is adjusted based on the first direction and/or the first distance, to cause the output light of the sub-area to be output to a second range corresponding to the output device, that is, to cause the entire output area to be in the first output state with respect to the first object. The second range is different from the first range.

For example, the backlight structure adjusts output angles of the output light of first (N-m) sub-areas based on the first distance sorted from small to large, to cause the output light of the sub-areas close to the first object to be output to the second range, to avoid light leakage caused by closeness to the first object and variation of the light output angle, where N is a total number of sub-areas, and m is a positive integer greater than or equal to 1.

The backlight structure adjusts the output angles of the output light of the first (N-m) sub-areas based on a degree of deviation of the first direction from the center line, that is, a first angle sorted from small to large, to cause the output light of the sub-areas closed to the first object to be output to the second range, to avoid the light leakage caused by the closeness to the first object and the variation of the light output angle.

In some embodiments, based on the first direction and/or the first distance, adjusting the light transmission amount of the output light of the sub-area of the output device can be specifically implemented in the following ways.

Based on the first direction and/or the first distance, a rotation angle of the liquid crystal element of the first output structure corresponding to the sub-area is adjusted, to cause brightness of the output light of the sub-area output to the first object to be uniform, that is, to cause the entire output area to be in the first output state with respect to the first object.

For example, based on the degree that the first object deviates from the center line of each of the plurality of sub-areas, that is, the first angle and/or the first distance sorted from small to large, rotation angles of the liquid crystal element of the first output structure corresponding to the first (N-m) sub-areas or all the sub-areas are adjusted, to cause the light transmission amount by the liquid crystal element to the output light to be uniform at the position of the first object, to cause the brightness of the output light of the sub-area output to the first object to be uniform, thereby avoiding the privacy leakage caused by bright light close to the first object.

Figure 9:
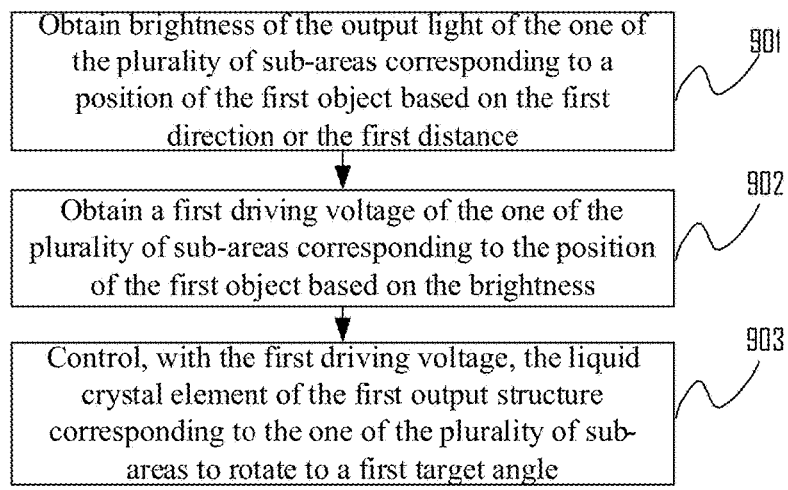
FIG. 9 is a schematic flow chart of a part of the control method consistent with the embodiments of the disclosure.

As shown in FIG. 9, adjusting the rotation angle of the liquid crystal element of the first output structure corresponding to the sub-area includes the following processes.

At 901, the output brightness of the sub-area corresponding to the position of the first object is obtained based on the first direction and/or the first distance.

A current driving voltage of the liquid crystal element of the first output structure corresponding to each of the plurality of sub-areas can be obtained first. Then based on the current driving voltage, the first direction, and the first distance, the output brightness of the each of the plurality of sub-areas corresponding to the position of the first object can be obtained by searching a brightness mapping table.

The brightness mapping table may include multiple correspondences, and each correspondence may be correspondence among the driving voltage, the direction, the distance, and the brightness.

At 902, a first driving voltage of the sub-area corresponding to the position of the first object based on the brightness.

A target brightness may be selected for each of the plurality of sub-areas corresponding to the position of the first object according to the output brightness of the each of the plurality of sub-areas corresponding to the position of the first object. The target brightness for the plurality of sub-areas may be same or different with each other. For example, the target brightness for the plurality of sub-areas may be a minimum of the output brightness of the plurality of sub-areas corresponding to the position of the first object, or a brightness less than the minimum of the output brightness of the plurality of sub-areas corresponding to the position of the first object. Then, the first driving voltage corresponding to the target brightness, the first direction, and the first distance is searched in the brightness mapping table.

At 903, with the first driving voltage, the liquid crystal element of the first output structure corresponding to the sub-area is controlled to rotate to a first target angle.

The liquid crystal element at the first target angle has a corresponding light transmission amount, to cause the brightness of the output light of the sub-area output to the first object through the liquid crystal element of the first output structure to be uniform.

Figure 10:
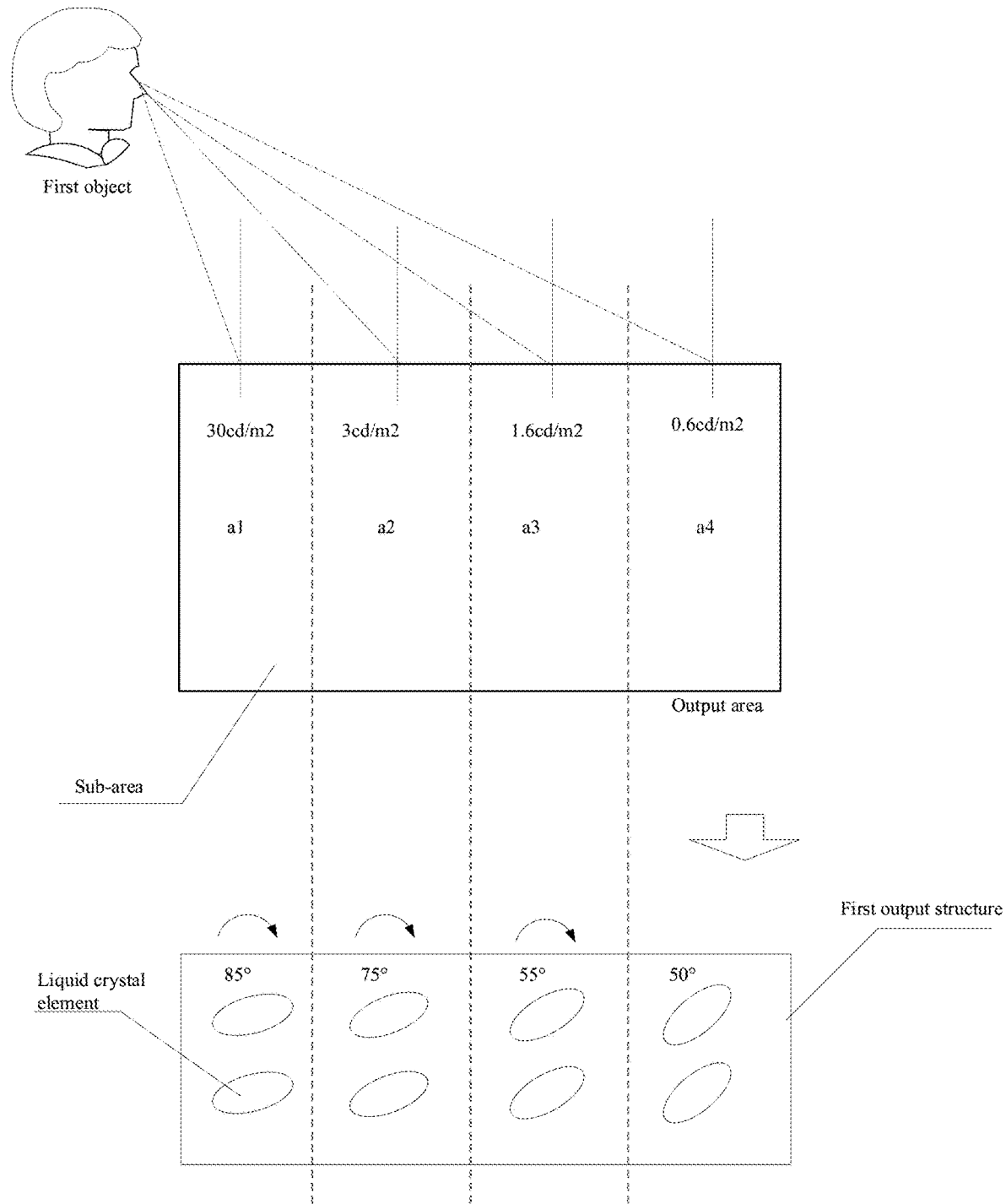
FIG. 10 is a schematic diagram of controlling the liquid crystal elements consistent with the embodiments of the disclosure.

For example, as shown in FIG. 10, taking the sub-areas in the strip layout as an example, based on the directions and distances of the first object relative to the sub-areas a1 to a4 and current driving voltage of the sub-areas a1 to a4, output brightness formed by the sub-areas a1 to a4 at the position of the first object is searched in the brightness mapping table. Based on the output brightness, 0.6 cd/m2, of the sub-area a4 with a largest distance and a largest angle as a benchmark, the first driving voltages for the sub-areas a1 to a3 are selected to cause the output brightness of the output light of each sub-area corresponding to the position of the first object to be 0.6 cd/m2. With the first driving voltages for the sub-areas a1 to a3, the liquid crystal elements of the first output structure corresponding to the sub-areas a1 to a3 are controlled to rotate to corresponding angles, which are 85°, 75°, and 55°, respectively, while the rotation angle of the liquid crystal elements of the first output structure corresponding to the sub-area a4 is kept at 50°, to cause the output brightness of the output light of each sub-area corresponding to the position of the first object to be 0.6 cd/m2. Therefore, for the first object within the first range, no matter where the first object moves to within the first range, the brightness of the output area viewed by the first object is uniform with a low value, thereby ensuring that the output content of the output device not to be viewed by the first object.

Figure 11:
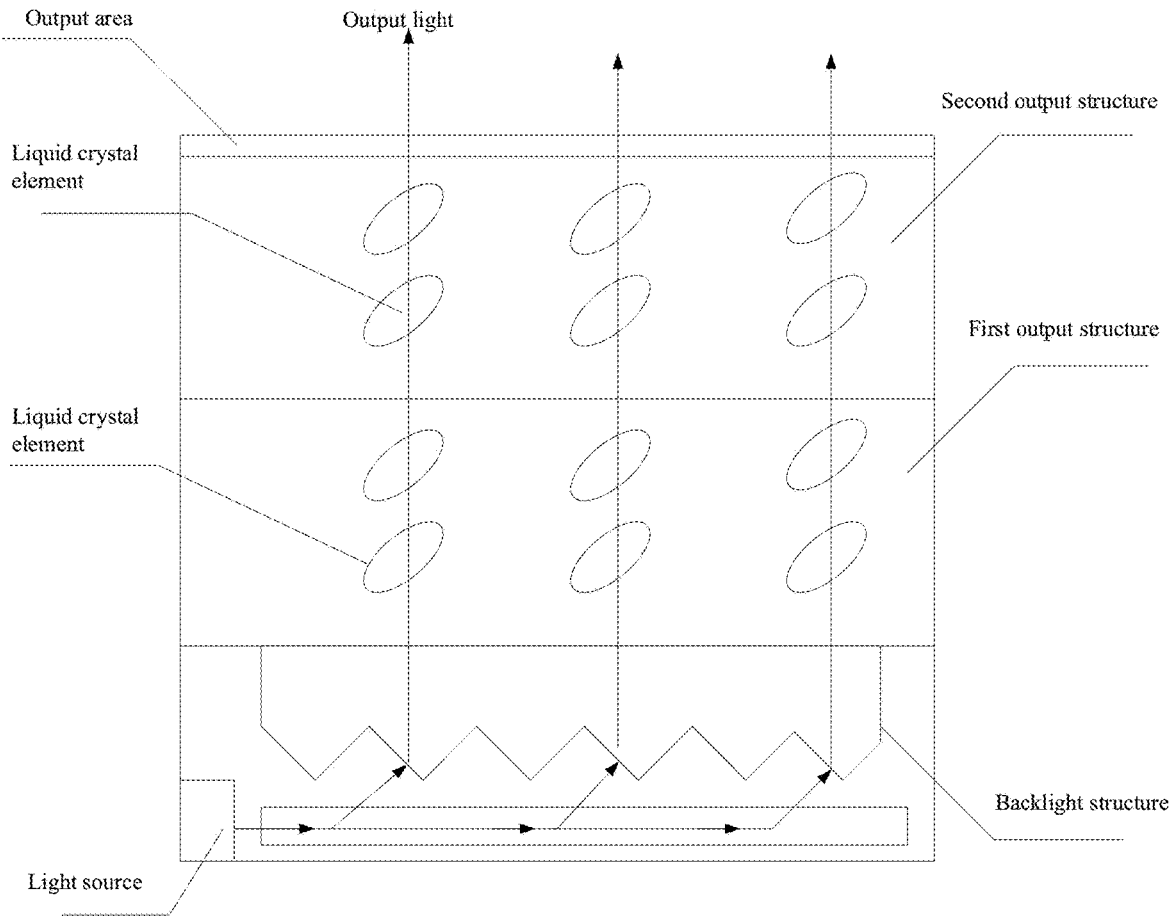
FIG. 11 is a schematic diagram of the liquid crystal elements of the first output structure and liquid crystal elements of a second output structure of the output device consistent with the embodiments of the disclosure.

Further, as shown in FIG. 11, the output device also includes a second output structure. The output light of the backlight structure is output at the output area through the second output structure after passing through the first output structure. The second output structure includes one or more liquid crystal elements. The second output structure may include another structure, for example, a polarizer or a filter glass.

A second object exists in a second range. The second object may be at least a part of an object of a human body, for example, a human body outline, a human head, a face, an eye, or a forehead. The second output structure is used to cause the output device to be in a second output state relative to the second object. The second output state is different from the first output state.

In some embodiments, the rotation angle of the liquid crystal element of the first output structure can be adjusted, to cause the output device to be in the second output state relative to the second object. The second output state may be a state that the second object can receive the output light of the output device to identify a state of the output content of the output device.

In some embodiments, the rotation angle of the liquid crystal element of the second output structure corresponding to the sub-area of the output area may be adjusted according to a second relative position relationship between the second object and the output device, to cause the output device to be in the second output state relative to the second object.

After the liquid crystal element of the second output structure is adjusted, although the output state of the output device relative to the first object may change, the actual output state after the change is still close to the first output state.

In some embodiments, the second relative position relationship may include a second direction of the second object relative to the sub-area and/or a second distance between the second object and the sub-area.

Figure 12:
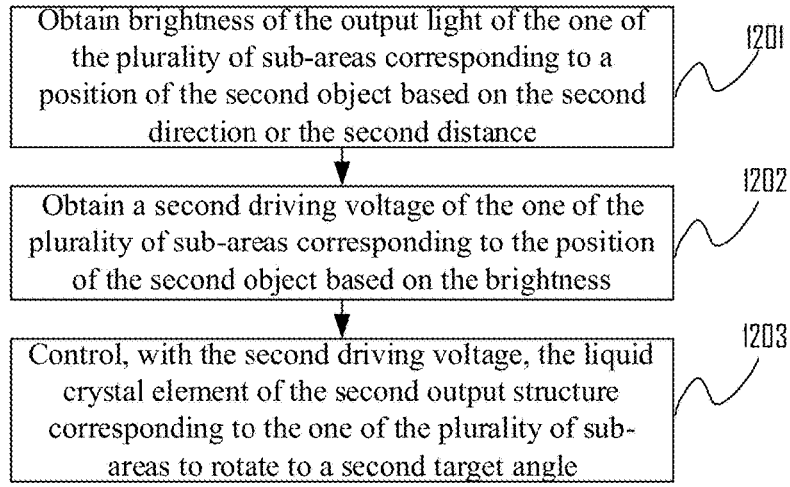
FIG. 12 is a schematic flow chart of another part of the control method consistent with the embodiments of the disclosure.

As shown in FIG. 12, adjusting the rotation angle of the liquid crystal element of the second output structure corresponding to the sub-area of the output area based on the second relative position relationship includes the following processes.

At 1201, brightness of the output light of the sub-area corresponding to a position of the second object is obtained based on the second direction and/or the second distance.

In some embodiments, a current driving voltage of the liquid crystal element of the second output structure corresponding to each of the plurality of sub-areas can be obtained. Then based on the current driving voltage, the second direction, and the second distance, the output brightness of the each of the plurality of sub-areas corresponding to the position of the second object can be obtained by searching the brightness mapping table.

At 1202, a second driving voltage of the sub-area corresponding to the position of the second object is obtained based on the brightness.

A target brightness may be selected for each of the plurality of sub-areas corresponding to the position of the second object according to the output brightness of the each of the plurality of sub-areas corresponding to the position of the second object. The target brightness for the plurality of sub-areas may be same or different with each other. For example, the target brightness for the plurality of sub-areas may be a minimum of the output brightness of the plurality of sub-areas corresponding to the position of the second object, or a brightness less than the minimum of the output brightness of the plurality of sub-areas corresponding to the position of the second object. Then, the second driving voltage corresponding to the target brightness, the second direction, and the second distance is searched in the brightness mapping table.

At 1203, with the second driving voltage, the liquid crystal element of the second output structure corresponding to the sub-area is controlled to rotate to the second target angle.

The liquid crystal element at the second target angle has a corresponding light transmission amount, to cause the brightness of the output light of the sub-area output to the second object through the liquid crystal element of the first output structure to be uniform.

Figure 13:
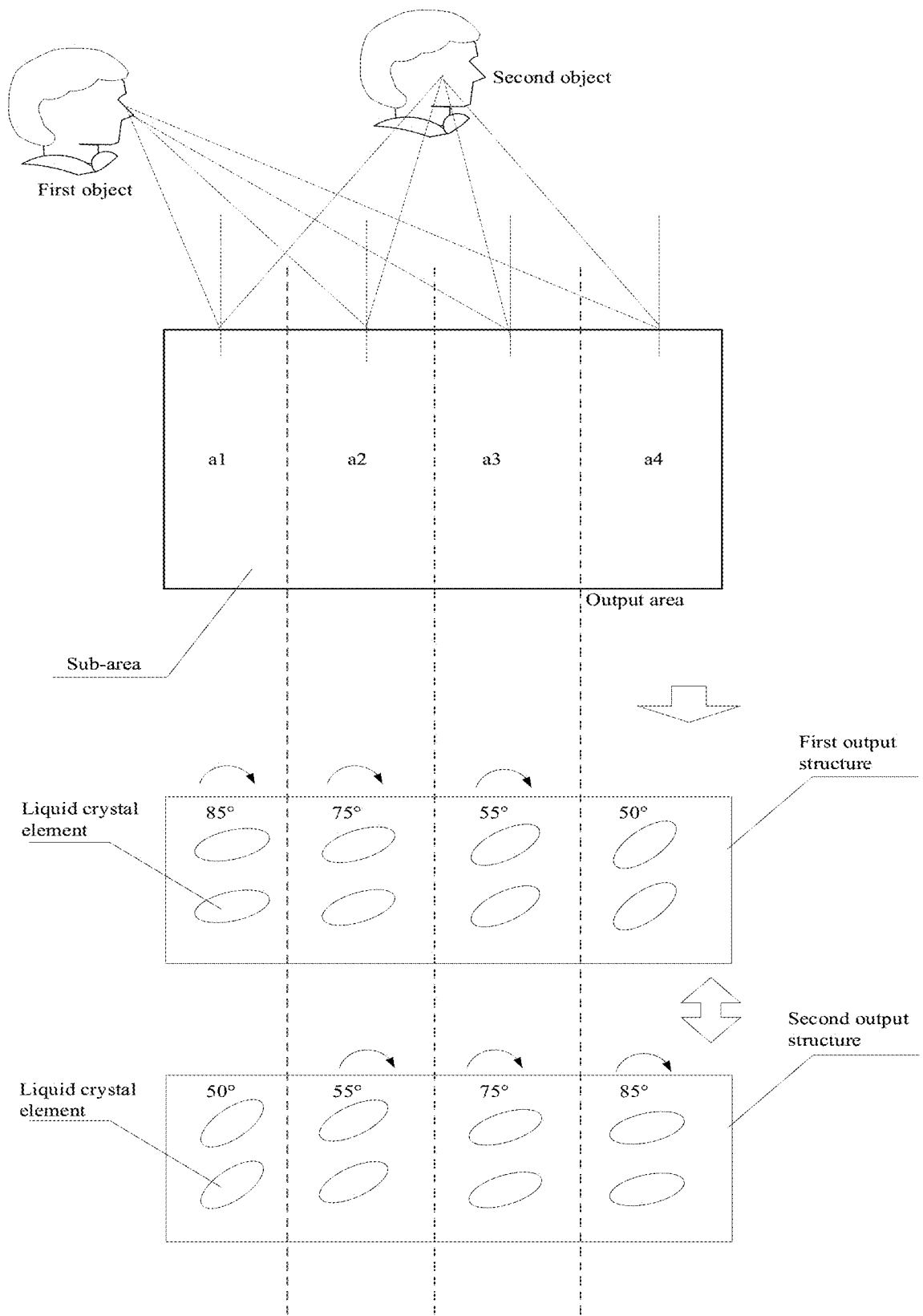
FIG. 13 is a schematic diagram of controlling the liquid crystal elements consistent with the embodiments of the disclosure.

For example, as shown in FIGS. 10 and 13, taking the sub-areas in the strip layout as an example, based on the directions and distances of the first object relative to the sub-areas a1 to a4 and current driving voltage of the sub-areas a1 to a4, output brightness formed by the sub-areas a1 to a4 at the position of the first object is searched in the brightness mapping table. Based on the output brightness, 0.6 cd/m2, of the sub-area a4 with a largest distance and a largest angle as a benchmark, the first driving voltages for the sub-areas a1 to a3 are selected to cause the output brightness of the output light of each sub-area corresponding to the position of the first object to be 0.6 cd/m2. With the first driving voltages for the sub-areas a1 to a3, the liquid crystal elements of the first output structure corresponding to the sub-areas a1 to a3 are controlled to rotate to corresponding angles, which are 85°, 75°, and 55°, respectively, while the rotation angle of the liquid crystal elements of the first output structure corresponding to the sub-area a4 is kept at 50°, to cause the output brightness of the output light of each sub-area corresponding to the position of the first object to be 0.6 cd/m2. Therefore, for the first object within the first range, no matter where the first object moves to within the first range, the brightness of the output area viewed by the first object is uniform with a low value, thereby ensuring that the output content of the output device not to be viewed by the first object. Further, based on the directions and distances of the second object relative to the sub-areas a1 to a4 and current driving voltage of the sub-areas a1 to a4, output brightness formed by the sub-areas a1 to a4 at the position of the second object is searched in the brightness mapping table. Based on a minimum output brightness, i.e., the output brightness of the sub-area a1 as a benchmark, the second driving voltages for the sub-areas a2 to a4 are selected to cause the output brightness of the output light of each sub-area corresponding to the position of the second object to be the minimum output brightness. With the second driving voltages for the sub-areas a2 to a4, the liquid crystal elements of the second output structure corresponding to the sub-areas a1 to a3 are controlled to rotate to corresponding angles, which are 55°, 75°, and 85°, respectively, to cause the output brightness of the output light of each sub-area corresponding to the position of the second object to be the minimum output brightness. Therefore, for the second object within the second range, through the compensation of the light transmission amount of the second output structure, the brightness of the output area viewed by the second object is uniform with a low value. For the first object, although the brightness of the output area is not uniform, due to the previous adjustment of the liquid crystal element of the first output structure, the output device is in the output state with a low brightness relative to the first object. After the adjustment of the liquid crystal element of the second output structure, the output device is in an output state with a lower brightness relative to the first object than that before the adjustment of the liquid crystal element of the second output structure. Therefore, the output content of the output device cannot be viewed by the first object, thereby avoiding the privacy leakage.

Figure 14:
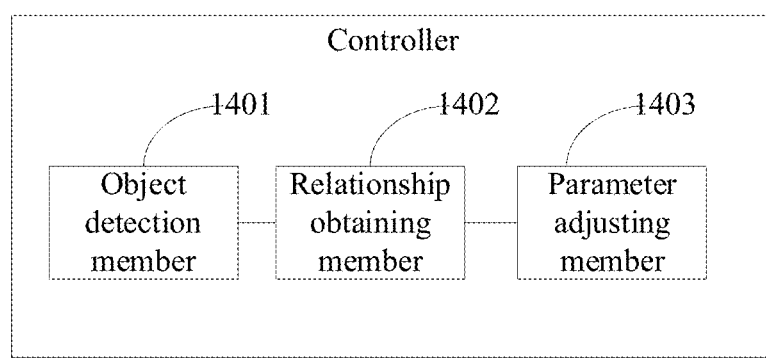
FIG. 14 is a schematic structural diagram of a controller consistent with the embodiments of the disclosure.

FIG. 14 is a schematic structural diagram of a controller consistent with the embodiments of the disclosure. The controller can be configured in the output device shown in FIG. 2. As shown in FIG. 14, the controller includes an object detection member 1401 configured to detect the first object within the first range corresponding to the output device, a relationship obtaining member 1402 configured to obtain the first relative position relationship between the first object and the output device, and a parameter adjustment member 1403 configured to adjust the output parameter of the output light of the output device based on the first relative position relationship, to cause the output device to be in the first output state relative to the first object.

After the controller detects the first object within the first range corresponding to the output device, the controller obtains the relative position relationship between the first object and the output device. Then the controller can adjust the output parameter of the output light of the output device based on the relative position relationship, to cause the output device to be in the first output state relative to the first object, thereby avoiding the privacy leakage when the output device is in another output state relative to the first object.

For the specific implementation of each member, reference may be made to the corresponding description of the above embodiments of the control method, which is omitted here.

Figure 15:
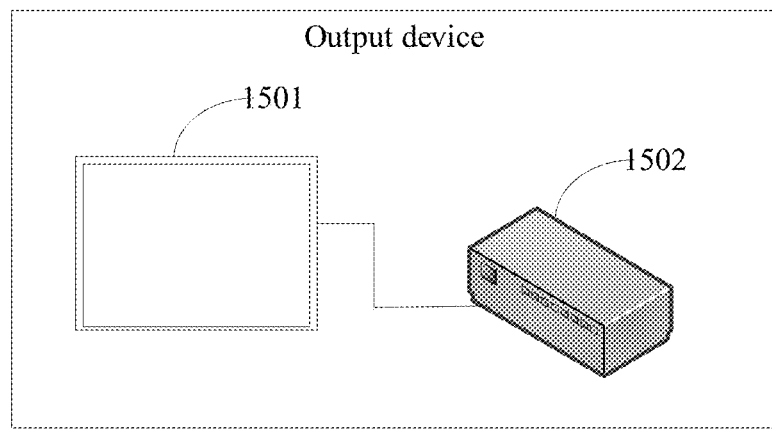
FIG. 15 is a schematic structural diagram of an output device consistent with the embodiments of the disclosure.

FIG. 15 is a schematic structural diagram of an output device consistent with the embodiments of the disclosure. The output device is configured to output specific content by outputting light. The output device may be a mobile phone, a pad, or a notebook having a display screen that can output the specific content for a user by outputting light. The output parameter of the output light of the output device is adjusted to avoid the privacy leakage when the output device is in an output state relative to the first object.

As shown in FIG. 15, the output device includes a light output device 1501 for outputting light, and a controller 1502 configured to detect a first object within a first range corresponding to the output device, obtain a first relative position relationship between the first object and the output device, and based on the first relative position relationship, adjust the output parameter of the output light of the output device, to cause the output device to be in a first output state relative to the first object.

The output device may also include a detection structure, for example, an image acquisition device such as a camera, an infrared scanner, and a sound sensor, which can be used to detect the first object within the first range corresponding to the output device.

After the controller detects the first object within the first range corresponding to the output device, the controller obtains the relative position relationship between the first object and the output device. Then the controller can adjust the output parameter of the output light of the output device based on the relative position relationship, to cause the output device to be in the first output state relative to the first object, thereby avoiding the privacy leakage when the output device is in another output state relative to the first object.

Figure 16:
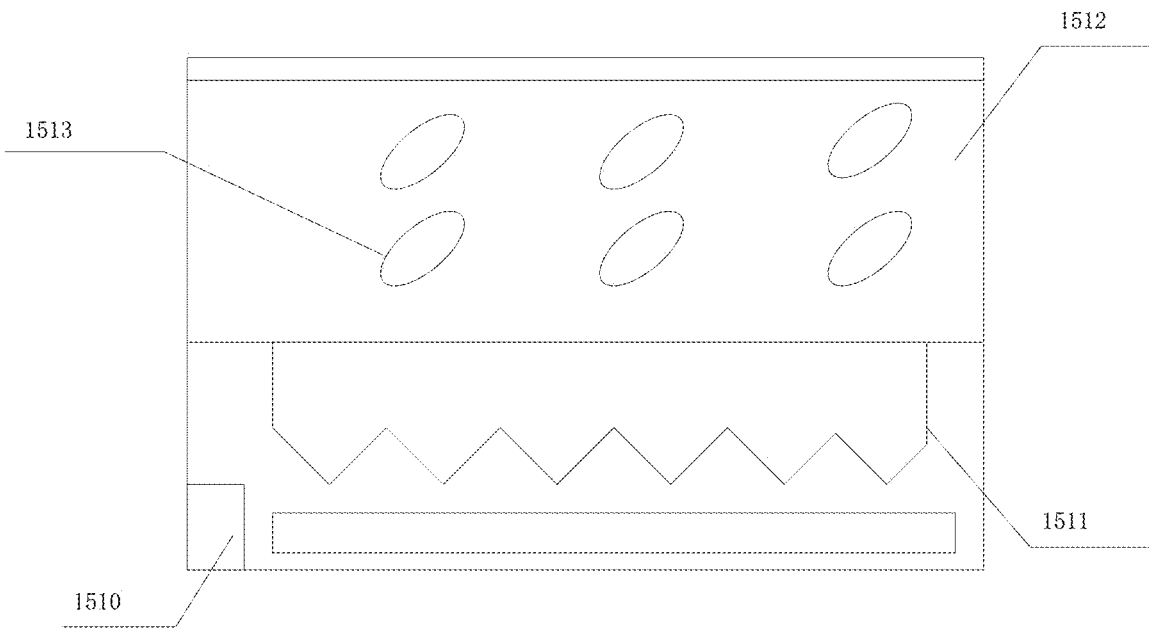
FIG. 16 is a schematic structural diagram of a light output device consistent with the embodiments of the disclosure.

FIG. 16 is a schematic structural diagram of a light output device 1501 consistent with the embodiments of the disclosure. As shown in FIG. 16, the light output device 1501 includes a light source 1510, a backlight structure 1511, and a first output structure 1512. The output light of the backlight structure 1511 passes through the first output structure 1512 to be output at the output area. The first output structure 1512 includes a liquid crystal element 1513.

The relative position relationship between the first object and a sub-area includes a first direction of the first object relative to the sub-area and/or a first distance between the first object and the sub-area.

When the controller 1502 adjusts the output parameter of the output light of the output device based on the first relative position relationship, the controller 1502 is specifically configured to adjust, through the backlight structure 1511, the output angle of the output light of the sub-areas based on the first direction or the first distance, to cause the output light at the sub-area to be output to a second range corresponding to the output device. The second range is different from the first range.

When the controller 1502 adjusts the output parameter of the output light of the output device based on the first relative position relationship, the controller 1502 is specifically configured to adjust a rotation angle of the liquid crystal element 1513 of the first output structure 1512 corresponding to the sub-areas based on the first direction or the first distance, to cause brightness of the output light of the sub-area output to the first object to be uniform.

For the specific implementation of each member, reference may be made to the corresponding description of the above embodiments of the control method, which is omitted here.

Taking a mobile phone screen with a privacy mode as the output device as an example, when the user activates the privacy mode, the display brightness of the screen for the user is not affected. A bystander at a side viewing angle can only see a black screen. However, due to different side viewing angles and different distances, the degree of black screen of the entire screen is different. The display of the screen may still be seen from some viewing angles, although the screen is a little dark.

Therefore, the technical solution consistent with the embodiments of the present disclosure can solve the problem that when the privacy mode is activated, the brightness of the screen seen from the side view angle is different, which leads to leakage of the displayed content, by a second layer in the screen, that is, a 2nd cell drive design optimization to achieve uniform brightness for the bystander at a test angle. Therefore, the bystander cannot see the display content of the screen.

By controlling the rotation angle of the liquid crystal elements in different areas, the light transmission amounts of different areas can be adjusted to achieve a uniform brightness (i.e., black screen) of the entire screen seen from a side viewing angle. When the camera on the screen detects someone nearby, the privacy mode can be turned on automatically. The camera tracks an angle, a distance, and a moving path of a human eye relative to the screen, and sends the information to a T-con on the screen. The T-con calculates a voltage required for the liquid crystal element to rotate a rotation angle and outputs the voltage to a driving IC of the screen, and then controls the liquid crystal element to rotate the rotation angle to cause the bystanders to see the black screen with a uniform brightness.

Figure 17:
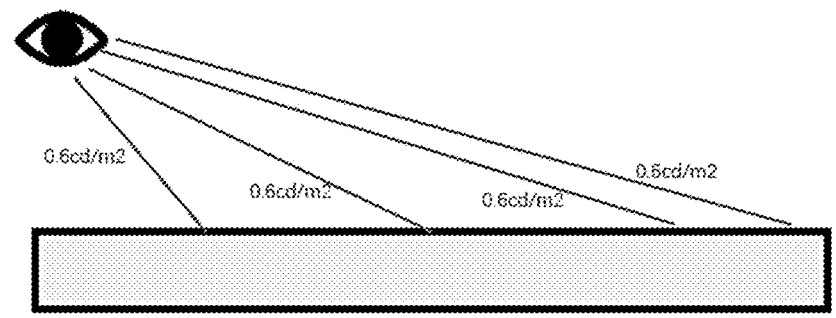
FIGS. 17-23 are schematic diagrams of controlling a screen of a mobile phone consistent with the embodiments of the disclosure.

The liquid crystal elements at different positions are controlled to rotate different rotation angles through different voltages, to cause the screen brightness seen from the side viewing angle in the privacy mode to be uniform. As shown in FIG. 17, the brightness seen from different side viewing angle in the privacy mode is uniform, thereby improving experience of the user using the privacy mode.

Figure 18:
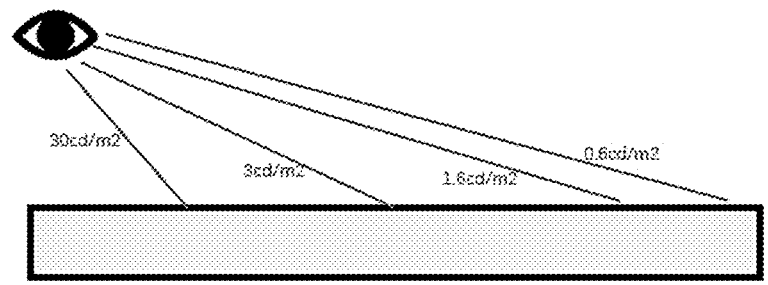
Figure 19:
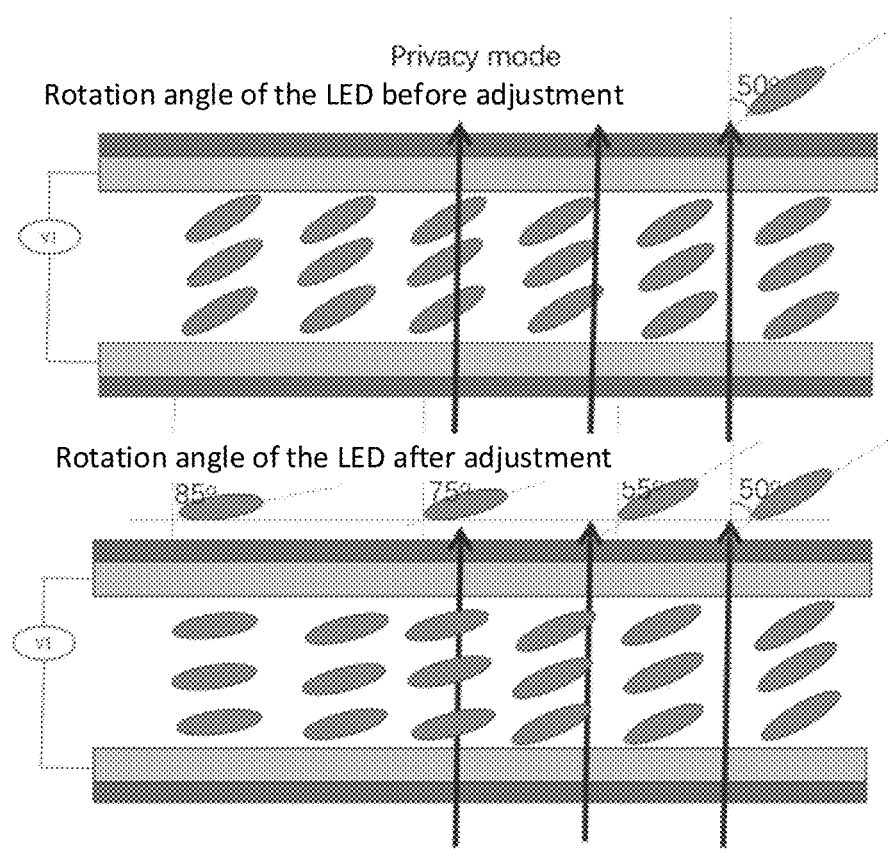
Figure 20:
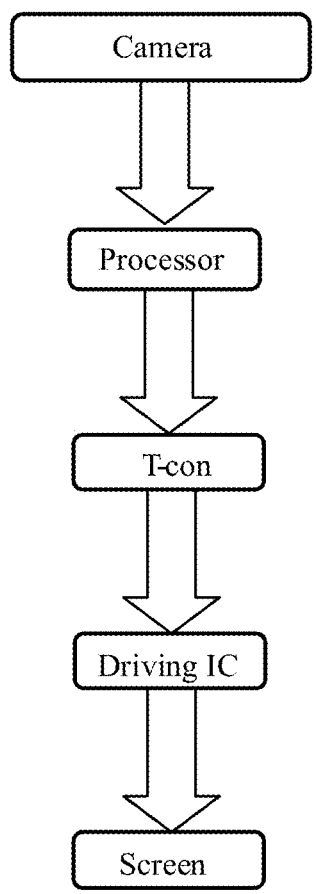
Figure 21:
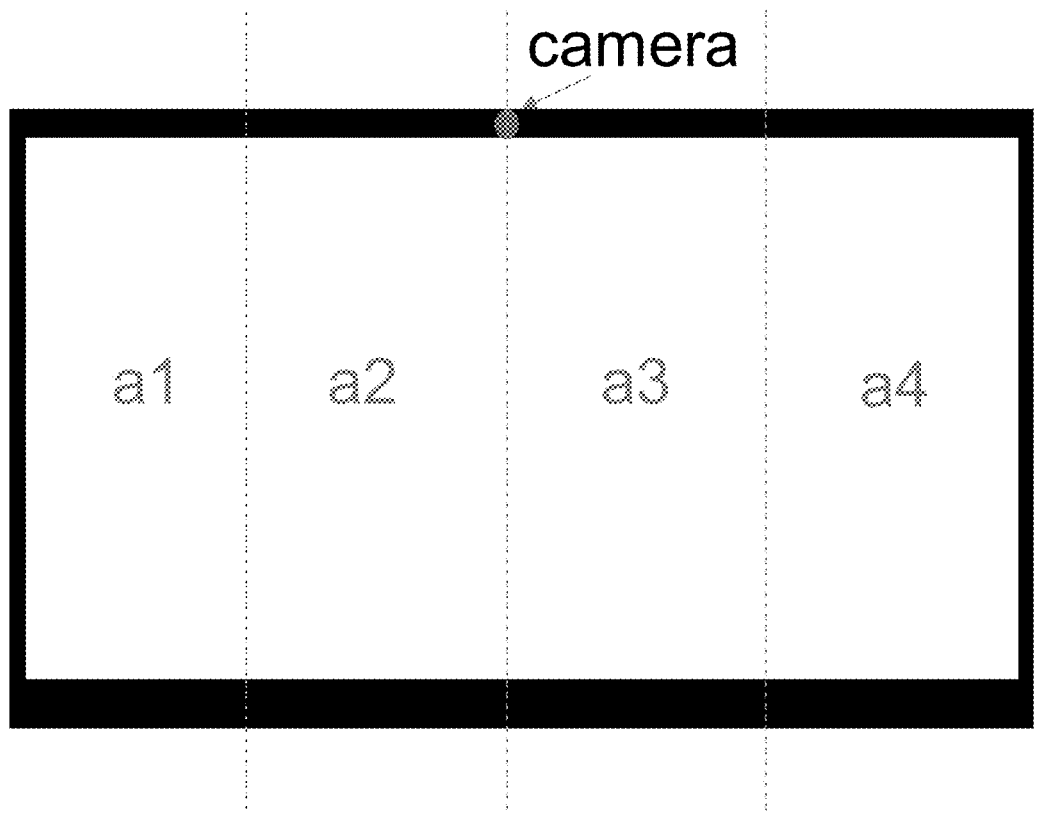
Figure 22:
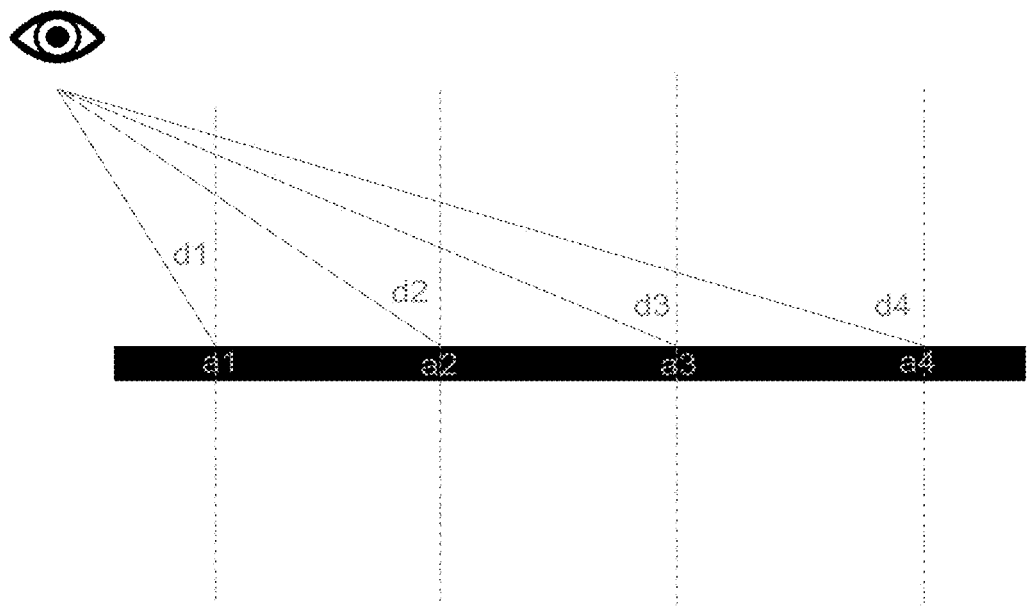
Figure 23:
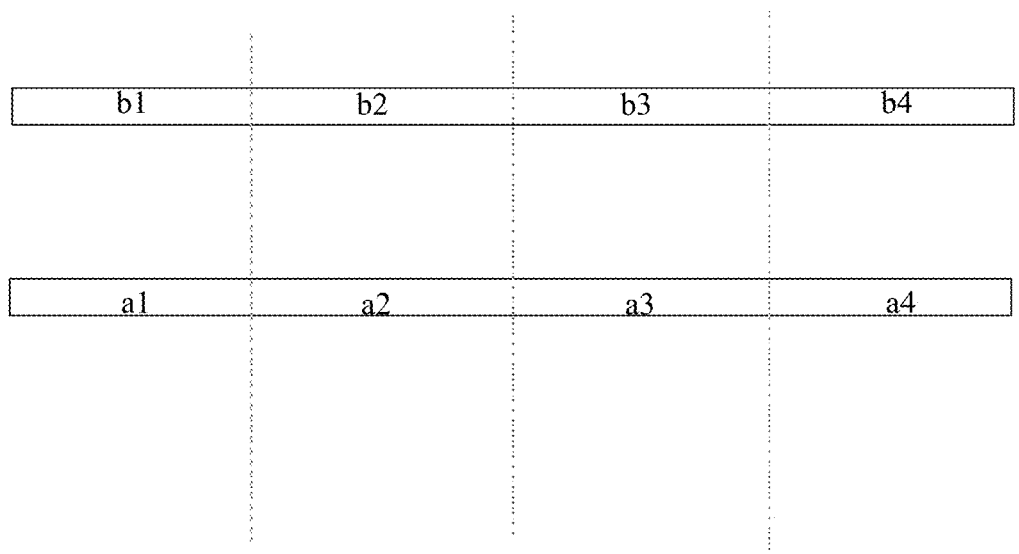

Specifically, the screen includes a light source, a backlight structure, a first cell, and a second cell (i.e., a privacy screen). If a same driving voltage is used to control the rotation of all liquid crystal elements of the second cell, the light transmission amount of the entire second cell (i.e., the privacy screen) is the same. When the bystander views the screen from a fixed angle, because the screen has a certain length, the viewing angles of an eyesight of the bystander with respect to different positions of the privacy screen are different. Because the light transmission amount of the liquid crystal element changes with the change of the viewing angle, the brightness of the privacy screen seen by the bystander changes with the change of the viewing angle as shown in FIG. 18. Therefore, the second cell (i.e., the privacy screen) is divided into different areas (i.e., the sub-areas). The driving voltage of each sub-area can be independently controlled to change the rotation angle of the liquid crystal element in the sub-area. When it is detected that a bystander (that is, the first object within the first range) is viewing the screen, the viewing angle of the eyesight of the bystander with respect to each sub-area of the privacy screen is obtained through calculation. After the T-con of the screen receives the viewing angle information, the T-con uses a built-in algorithm or look up the brightness mapping table to obtain the driving voltage information corresponding to each sub-area of the privacy screen, and then transmit the information to the driving IC of each sub-area of the screen. The driving IC outputs the driving voltage to different sub-areas of the privacy screen, to achieve the uniform brightness of the screen viewed by the bystander. The more sub-areas are divided, the better the final result is. The rotation angle of the liquid crystal element shown in FIG. 19 is example data. The specific rotation angle needs to be calculated and defined according to the specific situation and scene.

Referring to FIGS. 20-23, the screen is equally divided into four sub-areas, a1 to a4, along the H direction. When it is detected that a bystander is at a side of the screen by a camera, an infrared sensor, or a sound sensor, the screen is controlled to enter the privacy mode automatically. The camera of the screen detects and calculates angles, d1 to d4, of the eyesight of the bystander with respect to centers of the four sub-areas a1 to a4. Before the screen leaves the factory, the screen manufacturer tests the brightness of the privacy screen under different viewing angles when the privacy mode is turned on, and stores the brightness information in the T-con to form a brightness mapping table. By looking up the brightness mapping table, the brightness of the privacy screen corresponding to the viewing angles d1 to d4 is L1 to L4, and the brightness of L1 to L4 decreases gradually. For example, the T-con receives the values of d1 to d4 and the distance value (camera monitoring distance) from the screen, and obtains the brightness value of L1 to L4 according to the brightness mapping table in the built-in factory information. The algorithm built in the T-con uses L4 as a benchmark to calculate the driving voltages V1, V2, and V3 required to cause the brightness of the sub-areas a1, a2, and a3 to be L4.

Therefore, before adjustment, the driving voltages of each of the sub-areas a1 to a4 are the same, which are all V0. After adjustment, the driving voltage of the sub-area a1 is changed from V0 to V1, the driving voltage of the sub-area a2 is changed from V0 to V2, the driving voltage of the sub-area a3 is changed from V0 to V3, and the driving voltage of the sub-area a4 is maintained at V0. After the adjustment, the brightness of each sub-area is L4, so that the brightness of each sub-area of the privacy screen is uniform under different viewing angles.

Further, to prevent the user from feeling that the display brightness of the first cell is not uniform due to the adjustment of the second cell, the first cell is also adjusted to match the brightness of the second cell. The brightness of the second cell after the adjustment of the second cell is L4. The brightness of the first cell before the adjustment of the first cell is L0. To keep the brightness of the first cell at L0, the built-in algorithm of the T-con uses L0 as a benchmark to calculate the driving voltages Vb1, Vb2, Vb3, and Vb4 required to keep the brightness of the sub-areas b1, b2, b3, and b4 at L0. The driving voltage is delivered to each sub-area of the first cell through the driving IC of the first cell to control the rotation angle of the liquid crystal element in these sub-areas, to maintain the brightness of these sub-areas of the first cell to be L0. Thereby, the user does not experience non-uniform brightness.

It should be noted that the division of the area of the privacy screen includes but is not limited to the layouts shown in FIG. 4 and FIG. 5. The more sub-areas are divided, the better the consistency of the brightness of the screen.

The disclosed systems, apparatuses, and methods may be implemented in other manners not described here. For example, the devices described above are merely illustrative. For example, the division of units may only be a logical function division, and there may be other ways of dividing the units. For example, multiple units or members may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate members may or may not be physically separate, and a member shown as a unit may or may not be a physical unit. That is, the units may be located in one place or may be distributed over a plurality of network elements. Some or all of the members may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the application being indicated by the following claims.

What is claimed is:

1. A control method comprising:
   detecting a first object within a first range corresponding to an output device, the first object including a bystander of the output device;
   obtaining a first relative position relationship between the first object and the output device; and
   adjusting an output parameter of output light of the output device based on the first relative position relationship, to cause the output device to be in a first output state relative to the first object, to cause brightness of the output light of the output device in an output area to be uniform in response to the output area being viewed at a position within the first range, to cause the first object to see a black screen with the uniform brightness, and to cause a second object to receive the output light of the output device to identify output content of the output device, the second object being different from the first object.

2. The method of claim 1, wherein:
   an output area of the output device is divided into a plurality of sub-areas;
   the first relative position relationship includes a relative position relationship between the first object and one of the plurality of sub-areas; and
   adjusting the output parameter of the output light of the output device based on the first relative position relationship includes:
     adjusting an output parameter of output light of the one of the plurality of sub-areas based on the first relative position relationship.

3. The method of claim 2, wherein:
   the position relationship between the first object and the one of the plurality of sub-areas includes a first direction of the first object relative to the one of the plurality of sub-areas or a first distance between the first object and the one of the plurality of sub-areas; and
   adjusting the output parameter of the output light of the one of the plurality of sub-areas based on the first relative position relationship includes:
     adjusting a light transmission amount or an output angle of the output light of the one of the plurality of sub-areas based on the first direction or the first distance.

4. The method of claim 3, wherein the output device includes a backlight structure and a first output structure, output light of the backlight structure being output at the output area through the first output structure, the first output structure including a liquid crystal element.

5. The method of claim 4, wherein adjusting the output parameter of the output light of the one of the plurality of sub-areas based on the first relative position relationship includes:
   adjusting the light transmission amount of the output light of the one of the plurality of sub-areas based on the first direction or the first distance, including:
     adjusting a rotation angle of the liquid crystal element of the first output structure corresponding to the one of the plurality of sub-areas based on the first direction or the first distance, to cause brightness of the output light of the one of the plurality of sub-areas output to the first object to be uniform.

6. The method of claim 5, wherein adjusting the rotation angle of the liquid crystal element of the first output structure corresponding to the one of the plurality of sub-areas based on the first direction or the first distance, includes:
   obtaining the brightness of the output light of the one of the plurality of sub-areas corresponding to a position of the first object based on the first direction or the first distance;
   obtaining a first driving voltage of the one of the plurality of sub-areas corresponding to the position of the first object based on the brightness; and
   controlling, with the first driving voltage, the liquid crystal element of the first output structure corresponding to the one of the plurality of sub-areas to rotate to a first target angle, to cause the brightness of the output light of the one of the plurality of sub-areas output to the first object through the liquid crystal element of the first output structure to be uniform.

7. The method of claim 4, wherein adjusting the output parameter of the output light of the one of the plurality of sub-areas based on the first relative position relationship includes:
   adjusting the output angle of the output light of the one of the plurality of sub-areas based on the first direction or the first distance, including:
     adjusting, through the backlight structure, the output angle of the output light of the one of the plurality of sub-areas based on the first direction or the first distance, to cause the output light at the one of the plurality of sub-areas to be output to a second range corresponding to the output device, the second range being different from the first range.

8. The method of claim 7, wherein:
   the output device further includes a second output structure, the output light of the backlight structure being output at the output area by passing through the second output structure after passing through the first output structure, the second output structure including a liquid crystal element; and the second output structure is configured to cause the output device to be in a second output state relative to the second object, the second object being located within the second range, and the second output state being different from the first output state.

9. The method of claim 8, further comprising:
adjusting a rotation angle of the liquid crystal element of the second output structure corresponding to the one of the plurality of sub-areas based on a second relative position relationship, to cause the output device to be in the second output state relative to the second object, the second relative position relationship including a relative position relationship between the output device and the second object within the second range.

10. The method of claim 9, wherein:
the second relative position relationship includes a second direction of the second object relative to the one of the plurality of sub-areas or a second distance between the second object and the one of the plurality of sub-areas; and
adjusting the rotation angle of the liquid crystal element of the second output structure corresponding to the one of the plurality of sub-areas based on the second relative position relationship includes:
  obtaining brightness of the output light of the one of the plurality of sub-areas corresponding to a position of the second object based on the second direction or the second distance;
  obtaining a second driving voltage of the one of the plurality of sub-areas corresponding to the position of the second object based on the brightness; and
  controlling, with the second driving voltage, the liquid crystal element of the second output structure corresponding to the one of the plurality of sub-areas to rotate to a second target angle, to cause the brightness of the output light of the one of the plurality of sub-areas output to the second object through the liquid crystal element of the second output structure to be uniform.

11. An output device comprising:
a light output device configured to output light; and
a controller configured to:
  detect a first object within a first range corresponding to the output device;
  obtain a first relative position relationship between the first object and the output device, the first object including a bystander of the output device; and
  adjust an output parameter of output light of the output device based on the first relative position relationship, to cause the output device to be in a first output state relative to the first object, to cause brightness of the output light of the output device in an output area to be uniform in response to the output area being viewed at a position within the first range, to cause the first object to see a black screen with the uniform brightness, and to cause a second object to receive the output light of the output device to identify output content of the output device, the second object being different from the first object.

12. The output device of claim 11, wherein:
an output area of the output device is divided into a plurality of sub-areas;
the first relative position relationship includes a relative position relationship between the first object and one of the plurality of sub-areas; and
the controller is further configured to:
  adjust an output parameter of output light of the one of the plurality of sub-areas based on the first relative position relationship.

13. The output device of claim 12, wherein:
the position relationship between the first object and the one of the plurality of sub-areas includes a first direction of the first object relative to the one of the plurality of sub-areas or a first distance between the first object and the one of the plurality of sub-areas; and
the controller is further configured to:
  adjust a light transmission amount or an output angle of the output light of the one of the plurality of sub-areas based on the first direction or the first distance.

14. The output device of claim 13, wherein the output device includes a backlight structure and a first output structure, output light of the backlight structure being output at the output area through the first output structure, the first output structure including a liquid crystal element.

15. The output device of claim 14, wherein the controller is further configured to:
adjust the light transmission amount of the output light of the one of the plurality of sub-areas based on the first direction or the first distance, including:
  adjusting a rotation angle of the liquid crystal element of the first output structure corresponding to the one of the plurality of sub-areas based on the first direction or the first distance, to cause brightness of the output light of the one of the plurality of sub-areas output to the first object to be uniform.

16. The output device of claim 15, wherein the controller is further configured to:
obtain the brightness of the output light of the one of the plurality of sub-areas corresponding to a position of the first object based on the first direction or the first distance;
obtain a first driving voltage of the one of the plurality of sub-areas corresponding to the position of the first object based on the brightness; and
control, with the first driving voltage, the liquid crystal element of the first output structure corresponding to the one of the plurality of sub-areas to rotate to a first target angle, to cause the brightness of the output light of the one of the plurality of sub-areas output to the first object through the liquid crystal element of the first output structure to be uniform.

17. The output device of claim 14, wherein the controller is further configured to:
adjust the output angle of the output light of the one of the plurality of sub-areas based on the first direction or the first distance, including:
  adjusting, through the backlight structure, the output angle of the output light of the one of the plurality of sub-areas based on the first direction or the first distance, to cause the output light at the one of the plurality of sub-areas to be output to a second range corresponding to the output device, the second range being different from the first range.

18. The output device of claim 17, wherein:
the output device further includes a second output structure, the output light of the backlight structure being output at the output area by passing through the second output structure after passing through the first output structure, the second output structure including a liquid crystal element; and
the second output structure is configured to cause the output device to be in a second output state relative to the second object, the second object being located within the second range, and the second output state being different from the first output state.

* * * * *